April 12, 1966 R. T. SHEEHAN 3,245,555
ROTARY SELF-LEVELLING RESERVOIR CONVEYOR
Filed June 17, 1964 2 Sheets-Sheet 1
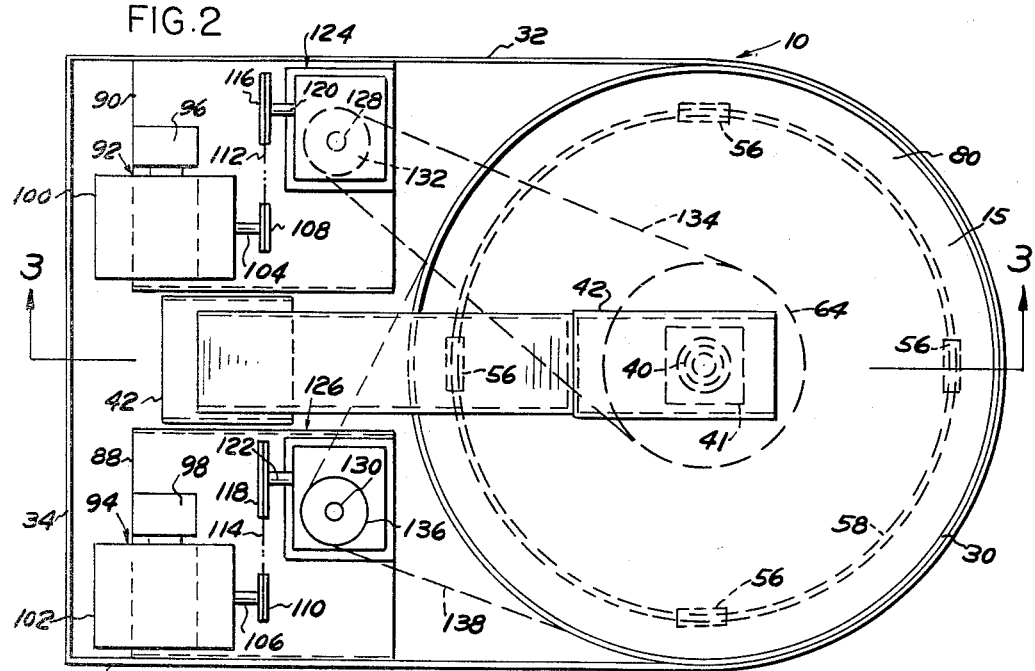
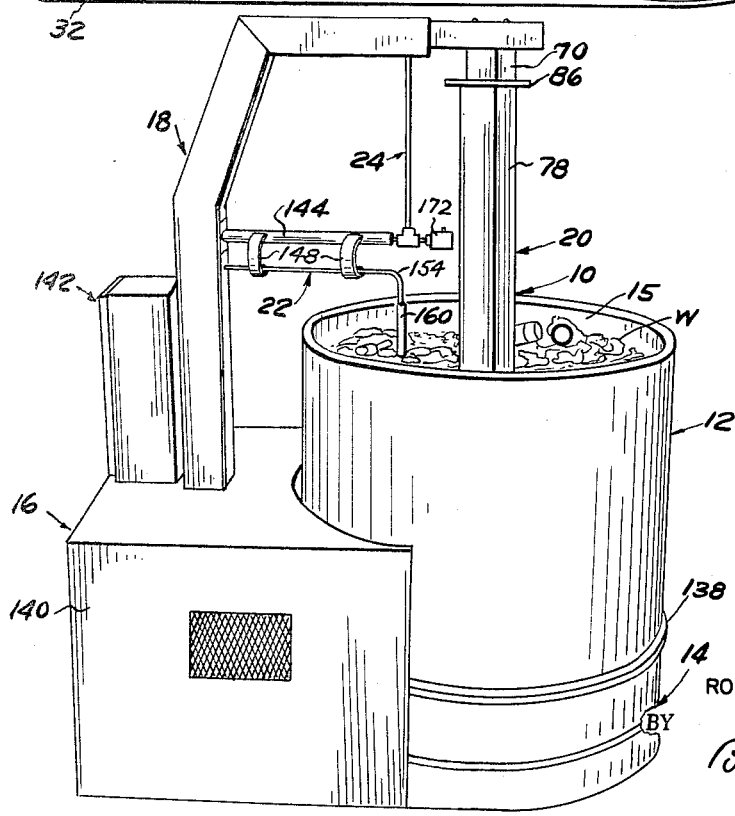
INVENTOR.
ROBERT T. SHEEHAN
BY *Barthel & Bugbee*
ATTORNEYS April 12, 1966   R. T. SHEEHAN   3,245,555
ROTARY SELF-LEVELLING RESERVOIR CONVEYOR
Filed June 17, 1964   2 Sheets-Sheet 2
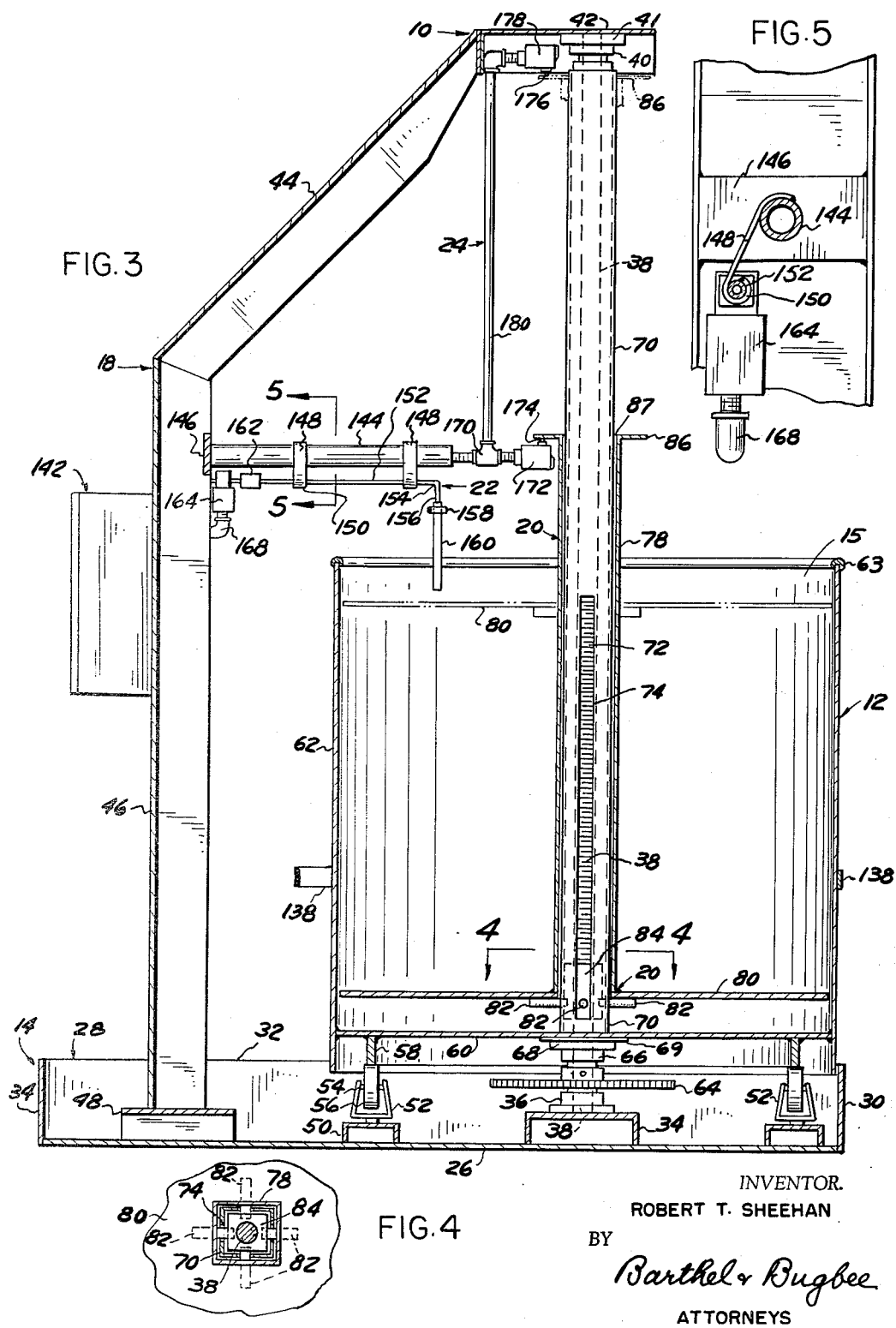
INVENTOR.
ROBERT T. SHEEHAN
BY
Barthel & Bugbee
ATTORNEYS

United States Patent Office 3,245,555
Patented Apr. 12, 1966

---

3,245,555
ROTARY SELF-LEVELLING RESERVOIR CONVEYOR
Robert T. Sheehan, 31530 Myrna Road, Livonia, Mich.
Filed June 17, 1964, Ser. No. 375,733
10 Claims. (Cl. 214—1)

This invention relates to article containers and, in particular, to containers which receive articles or materials for further transfer.

One object of this invention is to provide a rotary self-levelling reservoir conveyor for articles or materials whereby the level of the articles in the reservoir is maintained automatically at a substantially fixed height, regardless of the insertion or removal of articles or materials from the reservoir.

Another object is to provide a rotary self-levelling reservoir conveyor of the foregoing character wherein the articles or materials are supported upon a table which rotates with the reservoir and which is automatically raised and lowered so as to maintain the top surfaces of the articles or materials at a constant depth below the rim of the reservoir and at the same time facilitate the even removal of the articles or materials from the reservoir so as to maintain the surface thereof as nearly flat as possible.

Another object is to provide a rotary self-levelling reservoir conveyor of the foregoing character wherein the vertical travel of the table is automatically limited for vertical motion within a predetermined range of minimum and maximum levels and halted automatically when it reaches one of those levels.

Other objects and advantages of the invention will become apparent during the course of the following description of the accompanying drawings, wherein:

FIGURE 1 is a side perspective view looking slightly downward at an angle from above, of a rotary self-levelling reservoir conveyor, according to one form of the invention, with the material holder in its raised position;

FIGURE 2 is a top plan view, upon a slightly enlarged scale, of the rotary conveyor with the drive housing removed to show the driving mechanism, but with the inner tubular post in side elevation;

FIGURE 3 is a central vertical section taken along the line 3—3 in FIGURE 2, with the material holder in its lowered position and with the driving mechanism and its housing omitted to simplify the disclosure;

FIGURE 4 is a fragmentary horizontal section taken along the line 4—4 in FIGURE 3, showing details of the self-levelling mechanism; and FIGURE 5 is an enlarged fragmentary vertical cross-section taken along the line 5—5 in FIGURE 3, showing details of the level-sensing arrangement.

Hitherto, the arrangements for the reception of articles or materials, such as workpieces produced by a machine, and their delivery to other machines or locations, such as by a transfer conveyor, have been attended with much difficulty because of the constantly changing level of the articles or materials in the container or reservoir. As a result, the rise and fall of the top surface of the articles or materials in the reservoir have made it difficult to remove these quickly and easily. The present invention solves this problem, by providing a rotary self-levelling reservoir conveyor into which the articles or materials are fed from the supplying machine and from which they are removed as needed, the top surface of the articles or materials being maintained at a constant level by placing them upon a vertically-movable workpiece support which is automatically raised or lowered in accordance with the commands of a sensing device engageable with the articles, such as workpieces, or materials.

Referring to the drawings in detail, FIGURE 1 shows a rotary self-levelling reservoir conveyor, generally designated 10, as consisting generally of a rotary container 12 rotatably mounted upon a base structure 14 and containing a workpiece compartment or chamber 15. The rearward portion of the base structure 14 is covered by a removable drive housing 16 from which an upright structure 18 rises to guide and assist in supporting a vertically-movable article or material holder 20 and also to carry a level-sensing device 22 as well as a level-limiting device 24. The base structure 14 (FIGURES 2 and 3) includes a base plate 26 of approximately arch-shaped outline, the periphery of which is encircled by an upstanding wall or coaming 28 having a semi-circular front portion 30 integral with parallel side portions 32 connected at their rearward ends by a straight cross portion 34. Mounted on the base plate 26 centrally of the semi-circular wall portion 30 is an inverted square box-shaped elevated support 34 (FIGURE 3) to the top of which is secured a lower shaft bearing 36.

Rotatably mounted in the lower bearing 36 is the lower end of a vertical shaft 38, the upper end of which is rotatably mounted in an upper shaft bearing 40 (FIGURE 3) secured to a plate 41 which in turn is welded or otherwise secured to the under side of the top channel member 42 of the upright structure 18, the remainder of which includes an inclined channel member 44 and a vertical channel member 46 secured to and resting upon an elevated base channel member 48 which in turn rests upon the base plate 26. The various members 42, 44, 46 and 48 of the upright structure 18 are preferably secured to one another by welding in order to form a strong rigid construction.

Secured to and rising from the base plate 26 concentric with the lower shaft bearing 36 is an inverted circular or annular channel support 50 (FIGURE 3). Mounted on the support 50 at 90-degree intervals therearound are upstanding brackets 52, the upper ends of which rotatably support the axles 54 of four circumferentially-spaced rollers 56. Resting upon and rollable over the rollers 56 is an annular or circular track 58 concentric with the shaft 38 and welded or otherwise secured at its upper edge to the circular bottom wall 60 which in turn is welded or otherwise secured to the cylindrical side wall 62 of the rotary container 12. The side wall 62 at its upper end terminates in a rim 63.

Pinned or otherwise secured to the shaft 38 immediately above the lower shaft bearing 36 is a sprocket 64 (FIGURE 3) above which is mounted an intermediate shaft bearing 66 secured to a plate 68 which in turn is secured to a plate 69 welded or otherwise secured to the under side of the bottom wall 60 of the container 12. Secured to and rising from the upper side of the bottom wall 60 is an inner tubular guide post 70 (FIGURE 3) of square cross-section (FIGURE 4) with four vertically-elongated slots 74 in its four side walls. Within the lower portion of the guide post 70 above the bottom wall 60 of the container 12, the shaft 38 is threaded as at 72 for approximately two-fifths of its length. Telescoping with the inner tubular guide post 70 is an outer tubular guide sleeve 78 (FIGURE 4) to the bottom end of which is welded or otherwise secured a table or movable bottom well 80 constituting the workpiece support of the article or material holder 20.

The bottom wall 80 of the material holder 20 in turn rests upon four radial pins 82 seated at their inner ends in a nut 84 of square cross-section centrally threaded to receive and threadedly engage the threaded intermediate portion 72 of the shaft 38. The outer portions of the four pins 82 project radially outward through the elongated vertical slots 74 in the tubular guide post 70 beneath the movable bottom wall 80, which they thus support. Secured to the outer guide sleeve 78 is a circular plate or disc 85 (FIGURE 2) having a square central hole 87 for the passage of the inner tubular guide post 70. A sufficient clearance exists between the outer tubular guide sleeve 78 and the inner tubular post 70 to permit free sliding of the former relatively to the latter as the article holder 20 moves upward or downward in response to the rotation of the shaft 38.

Mounted on the base plate 26 on opposite sides of the base channel member 48 of the supporting structure 18 are two inverted channel-shaped platforms 88 and 90 respectively (FIGURE 2) which support the screwshaft rotating unit, generally designated 92 and the container-rotating unit, generally designated 94 respectively. These units 92 and 94 include motor starters 96 and 98 for electric motors 100 and 102 having output shafts 104 and 106 carrying output pulleys 108 and 110 respectively. The pulleys 108 and 110 are drivingly connected by belts 112 and 114 to input pulleys 116 and 118 upon the input shafts 120 and 122 of speed-reducing gear boxes 124 and 126 having output shafts 128 and 130. The output shaft 128 of the reduction gear box 124 projects downwardly from the bottom thereof and on its lower end carries a drive sprocket 132 drivingly connected to the sprocket 64 by a sprocket chain 134. The output shaft 130 of the reduction gear box 126 on the other hand projects upward and at its upper end carries a drive pulley 136 which drives the container 12 by a belt 138 encircling the cylindrical wall 62 thereof (FIGURES 2 and 3). The container-rotating unit 94 and screwshaft rotating unit 92 are enclosed by a box-shaped removable housing 140 (FIGURE 1).

Mounted on the vertical member 46 of the upright structure 18 (FIGURE 3) is an electrical control box 142 which contains the electrical control devices for the level-sensing device 22 and level-limiting device 24. The level-sensing device 22 and level-limiting device 24 are both mounted on a horizontal pipe 144 which at its rearward end is welded or otherwise secured to a cross plate or cross bar 146 which in turn is welded horizontally between the flanges of the vertical portion 46 of the upright structure 18 (FIGURE 5). Secured to and projecting downwardly from the pipe 144 are two spaced parallel arms 148, the outer ends of which terminate in bearings 150. Rotatably mounted in the bearings 150 is the horizontal portion 152 of an angle rod 154, the vertical portion 156 of which (FIGURE 3) at its lower end carries a coupling 158 to which is connected the upper end of an article contacting finger or sensing feeler 160 which projects downward toward and almost into contact with the table 80 in its uppermost (dotted line) position of FIGURE 3, so as to intercept and be engaged by articles resting thereon.

The rearward end of the horizontal portion 152 of the angle rod 154 passes into a coupling 162 near the upper end of a sensing limit switch 164, the lower end of which is connected by wiring (not shown) passing through an electrical elbow conduit 168 to the electrical control box 142. The limit switch 164 is in its circuit-closing condition in the vertical position of the feeler 160 shown in FIGURE 3 and is opened when the feeler 160 is swung into an inclined position to rotate the angle rod 154 when the table 80 is high enough so that the articles on the table 80 engage the feeler 160 and swing it into an inclined position, as explained more fully in connection with the operation of the invention.

Threaded into the outer or forward end of the pipe 144 is a T-conduit 170 (FIGURE 3) forming the support and conductor conduit of the level-limiting device 24. The T-conduit 170 at its outer end carries a lower limit switch 172 with an operating plunger 174 engageable by the disc 84 on the upper end of the outer guide sleeve 78 in the lowermost position of the article or material holder 20. The disc 84 in the upper position of the holder 20, shown in dotted lines in FIGURE 3, engages the operating plunger 176 of an upper limit switch 178 mounted on the upper end of the vertical section 180 of the T-conduit 170. Wiring (not shown) extending through the T-conduit 170 and pipe 144 connects the limit switches 172 and 178 to the electrical control box 142.

In the operation of the rotary self-levelling reservoir conveyor 10 of this invention, let it be assumed that the table 80 is in its fully lowered and empty position (FIGURE 3), ready to be loaded. The operator either manually or by mechanical means, such as a conveyor, or by placing the reservoir 10 next to a machine which is ejecting workpieces W, causes the workpieces W to fall into and fill up the workpiece compartment 15 to a level slightly below the rim 63 of the container 12. In such a position, the workpieces will engage and swing the sensing feeler 160 of the sensing device 22 when the container 12 is rotated. Any suitable conventional transfer conveyor (not shown) is preferably arranged adjacent the container 12 of the rotary transfer reservoir 10 so as to remove the workpieces W from the compartment 15 and transfer them to the next stage of operation, or this may be done manually by the operator, as is most convenient under the circumstances.

The motors 100 and 102 of the screwshaft-rotating unit 92 and container-rotating unit 94 are then started, causing the container 12 to rotate so as to move the workpieces W in an orbital path so that they pass beneath the sensing feeler 160 of the sensing device 22. As long as the workpieces W are at a sufficiently high level to engage and swing the sensing feeler 160 to open the circuit of the sensing limit switch 164, the screwshaft-rotating motor 100 remains de-energized and the screwshaft 38 remains stationary, and the table or bottom wall 80 of the workpiece holder 20 remains at a constant level.

When the workpieces W are removed to such an extent that they no longer intercept the sensing feeler 160 and the level of their tops drops below the feeler 160, the latter swings downward into its vertical position, rotating the angle rod 154 in a counterclockwise direction to close the limit switch 164 and energize the motor 100 of the screwshaft rotating unit 92. This action causes the output shaft 104 of the motor 100 to rotate, consequently rotating the output sprocket 132 of the reduction gear box 124 so as to rotate the screwshaft 38 and consequently cause the nut 84 to travel upward, carrying with it the table or bottom wall 80 of the article or material holder 20. As a consequence, the workpieces W move upward in the chamber 15 until they again intercept the sensing feeler 160 as they rotate within the rotating container 12, again swinging the sensing finger 160 and angle rod 154 to again open the circuit in the limit switch 164. The opening of the limit switch 164 halts the screwshaft-rotating motor 100 until the workpieces W are again removed to a sufficient extent to permit the sensing feeler 160 to swing back to a vertical position without being intercepted by the workpieces W. This action continues until the table 80 has been raised to its maximum height shown by the dotted line position in FIGURE 3, whereupon the disc 86 in the upper end of the guide sleeve 78 engages the operating plunger 176 of the upper limit switch 178 and opens the circuit therein so as to halt the screwshaft-rotating motor 100. This occurs when all of the workpieces W have been removed from the chamber 15 so that nothing is in a position to intercept and swing the sensing device feeler 160 to operate the limit switch 164.

To return the table 80 to its lowermost or solid line position of FIGURE 3 in order to refill the container 12, the operator reverses the motor 100 so as to cause the screwshaft 38 to rotate reversely and consequently cause the nut 84 to travel downward, taking with it the table 80. When the latter reaches its lowermost position shown in solid lines in FIGURE 3, the disc 86 engages the operating plunger 174 of the lower limit switch 172, opening the circuit therein and consequently again de-energizing the screwshaft rotating motor 100. The latter must again be reversed in order to be ready to rotate in a forward direction and cause the screwshaft 38 to rotate forwardly so as to raise the table 80 when the sensing feeler 160 calls for such action by energizing the screwshaft rotating motor 100 in response to its being intercepted and swung by workpieces within the workpiece compartment 15 piled sufficiently high therein to encounter the sensing feeler 160.

As a modification, this invention includes the substitution for the mechanical feeler 160 of a light source and photoelectric cell mounted with the light path extending across the reservoir so as to be intercepted by the top of a workpiece and thereby causing halting of the driving motor 100 of the screwshaft rotating unit 92, the removal of workpieces to a level offering no interception of the light path causing re-energization of the motor 92 and consequent raising of the work support 80 to a level where interception of the light path by the top of a workpiece again occurs.

What I claim is:

1. A rotary self-levelling reservoir conveyor, comprising
   a base structure,
   a conveyed-material reservoir rotatably mounted on said base structure,
   motor-driven reservoir-rotating means operatively connected to said reservoir for rotating said reservoir relatively to said base structure,
   a conveyed-material support disposed within said reservoir for rotation therewith and mounted for vertical travel relatively thereto,
   mechanism operatively connected to said conveyed-material support for moving said support vertically relatively to said reservoir,
   and conveyed-material level-controlling means responsive to a fall in level of the conveyed material below a predetermined level in said reservoir for actuating said mechanism to raise said support and responsive to the rise in level of the conveyed material to said predetermined level for halting said mechanism.

2. A rotary self-levelling reservoir conveyor, according to claim 1, wherein said mechanism comprises electromotive mechanism and wherein said level-controlling means includes a level-sensing device disposed in the path of travel of conveyed material in said reservoir at said predetermined level and connected in operation-controlling relationship with said electromotive mechanism.

3. A rotary self-levelling reservoir conveyor, according to claim 2, wherein said level-sensing device includes a conveyed-material feeler engageable with the top of the conveyed material at said predetermined level.

4. A rotary self-levelling reservoir conveyor, according to claim 3, wherein an electric switch is operatively connected to said feeler to open and close the electrical circuit to said electromotive mechanism respectively in response to the rise and fall of the top of the conveyed material up to and below said predetermined level.

5. A rotary self-levelling reservoir conveyor, according to claim 2, wherein said electromotive mechanism includes an electric motor having a starting circuit and wherein said level-controlling means operates in response to the rise and fall of the top of the conveyed material up to and below said predetermined level for respectively halting and restarting said motor.

6. A rotary self-levelling reservoir conveyor, according to claim 4, wherein the electrical circuit also contains a normally-closed limit switch which is opened in response to the ascent of the conveyed material support to a predetermined maximum level.

7. A rotary self-levelling reservoir conveyor, according to claim 4, wherein the electrical circuit also contains a normally-closed limit switch which is opened in response to the descent of the conveyed material support to a predetermined minimum level.

8. A rotary self-levelling reservoir conveyor, according to claim 1, wherein said conveyed-material support includes a vertically-movable bottom wall in said reservoir and wherein said mechanism includes an elevating device operatively connected to said bottom wall.

9. A rotary self-levelling reservoir conveyor, according to claim 8, wherein said elevating device includes a screwshaft element and a threaded nut element thereon rotatable relatively to one another, said nut element being operatively connected to said bottom wall, one of said elements being rotatably connected to said support-moving mechanism.

10. A rotary self-levelling reservoir conveyor, according to claim 1, wherein said reservoir has an annular side wall portion and wherein said reservoir-rotating means includes a motor and a belt driven by said motor and engaging said annular portion in partially-encircling relationship therewith.

References Cited by the Examiner
UNITED STATES PATENTS

| | | | |
|---|---|---|---|
| 1,792,321 | 2/1931 | Phillip | 222—405 X |
| 1,983,176 | 12/1934 | Klomparens | 220—93 |
| 2,381,505 | 8/1945 | Lindholm | 222—64 |

MARVIN A. CHAMPION, *Primary Examiner.*